US010750550B2

(12) United States Patent
Zhang

(10) Patent No.: US 10,750,550 B2
(45) Date of Patent: Aug. 18, 2020

(54) RECEIVE END DETERMINING METHOD, RELATED DEVICE, AND COMMUNICATIONS SYSTEM

(71) Applicant: HUAWEI TECHNOLOGIES CO., LTD., Shenzhen, Guangdong (CN)

(72) Inventor: Xiangdong Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 42 days.

(21) Appl. No.: 16/146,708

(22) Filed: Sep. 28, 2018

(65) Prior Publication Data
US 2019/0037616 A1 Jan. 31, 2019

Related U.S. Application Data

(63) Continuation of application No. PCT/CN2016/077963, filed on Mar. 31, 2016.

(51) Int. Cl.
H04W 76/10 (2018.01)
(52) U.S. Cl.
CPC .................. H04W 76/10 (2018.02)
(58) Field of Classification Search
CPC ..................................... H04W 76/10
See application file for complete search history.

(56) References Cited

U.S. PATENT DOCUMENTS 9,264,968 B2    2/2016  Tabet et al.
2012/0182926 A1 7/2012  Yu et al.
2014/0328243 A1* 11/2014 Etemad ............... H04W 4/06
                                                   370/312
2015/0085740 A1* 3/2015  Kalapatapu ....... H04W 88/04
                                                   370/315

(Continued)

FOREIGN PATENT DOCUMENTS

CN    104717714 A    6/2015
CN    204707282 U   10/2015

(Continued)

OTHER PUBLICATIONS

International Search Report issued in International Application No. PCT/CN2016/077963 dated Jan. 4, 2017, 21 pages.

(Continued)

Primary Examiner — Brian D Nguyen
(74) Attorney, Agent, or Firm — Fish & Richardson P.C.

(57) ABSTRACT

The present disclosure relates to a receive end determining method. In one example method, a first multiplex bearer between a terminal device and a wearable device, or a second multiplex bearer between the terminal device and a base station is established. The first multiplex bearer is used to transmit data between the wearable device and a first device. The first device includes one of the base station, the terminal device, or a combination of both. The second multiplex bearer is used to transmit data between the base station and a second device. The second device includes one of the wearable device, the terminal device, or a combination of both. The terminal device receives data from the wearable device through the first multiplex bearer, or receives the data from the base station through the second multiplex bearer. A destination receive end is determined based on indication information of the data.

20 Claims, 9 Drawing Sheets

(56) References Cited

U.S. PATENT DOCUMENTS

| | | |
|---|---|---|
| 2015/0156693 A1 | 6/2015 | Tabet et al. |
| 2015/0230209 A1 | 8/2015 | Jactat et al. |
| 2016/0100303 A1 | 4/2016 | Kim et al. |
| 2016/0142991 A1* | 5/2016 | Classon .............. H04W 56/001 370/350 |
| 2017/0019833 A1 | 1/2017 | Luo et al. |
| 2017/0064731 A1* | 3/2017 | Wang ................ H04W 72/1226 |
| 2017/0195867 A1 | 7/2017 | Kim et al. |
| 2017/0347341 A1* | 11/2017 | Zhang ................. H04W 72/042 |
| 2018/0049209 A1* | 2/2018 | Hu ........................ H04W 48/18 |
| 2018/0063855 A1* | 3/2018 | Xu ......................... H04W 72/12 |
| 2018/0213582 A1* | 7/2018 | Li ......................... H04W 88/06 |
| 2018/0324879 A1 | 11/2018 | Lecroart et al. |
| 2019/0045367 A1* | 2/2019 | Mueck .................. H04W 16/14 |
| 2019/0045574 A1* | 2/2019 | Feng ..................... H04W 76/27 |

FOREIGN PATENT DOCUMENTS

| | | |
|---|---|---|
| CN | 105357757 A | 2/2016 |
| DE | 202015102112 U1 | 8/2015 |
| JP | 2007074509 A | 3/2007 |
| JP | 2015532545 A | 11/2015 |
| JP | 2017511982 A | 4/2017 |
| WO | 2014087556 A1 | 6/2014 |
| WO | 2015125479 A1 | 8/2015 |

OTHER PUBLICATIONS

Office Action issued in Chinese Application No. 201680049409.X dated Oct. 22, 2019, 16 pages (With English Translation).
Extended European Search Report issued in European Application No. 16895932.8 dated Mar. 7, 2019, 6 pages.
Office Action issued in Japanese Application No. 2018-550403 dated Jul. 16, 2019, 14 pages (with English translation).

* cited by examiner

RECEIVE END DETERMINING METHOD, RELATED DEVICE, AND COMMUNICATIONS SYSTEM

CROSS-REFERENCE TO RELATED APPLICATIONS

This application is a continuation of International Application No. PCT/CN2016/077963, filed on Mar. 31, 2016, the disclosure of which is hereby incorporated by reference in its entirety.

TECHNICAL FIELD

The present invention relates to the communications field, and in particular, to a receive end determining method, a related device, and a communications system.

BACKGROUND

The Internet of Things may implement interconnection between a person and a thing or between one thing and another. Possible application includes various aspects such as smart grid, intelligent agriculture, intelligent transportation, and environment detection. A wearable device (WD) application is a type of important application of the Internet of Things, that is, a portable device that is directly worn on a body or integrated to a piece of clothing or an accessory of a user. A wearable device is a hardware device, and also implements powerful functions through software support, data exchange, and cloud-based interaction.

In the prior art, different bearers are established to distinguish between different data directions. For example, a bearer herein may be understood as a data bearer (DRB). For example, there are three bearers DRBs between a wearable device and a terminal device: a DRB1, a DRB2, and a DRB3. The DRB1 is used to transmit data between the wearable device and relay UE. The DRB2 is used to transmit data between the wearable device and a network. In this case, a corresponding bearer DRB-a is required between the terminal device and a base station, to complete data transmission between the wearable device and the base station together with the DRB2. In this case, for uplink data (sent by the wearable device), a destination address of the data on the DRB2 indicates only the base station. In other words, for downlink data (sent by the network), a destination address of the data on the DRB-a indicates only the wearable device. The DRB3 is used to transmit data to both the terminal device and the base station. Similarly, in this case, a corresponding bearer DRB-b is required between the terminal device and the base station, to complete data transmission between the wearable device and the base station together with the DRB3. A difference lies in that: For uplink data, a destination address of the data on the DRB3 indicates both the terminal device and the base station. In other words, for downlink data, a destination address of the data on the DRB-b indicates both the terminal device and the wearable device.

As described above, in actual application, bearers need to be established based on different data directions. Therefore, a relatively large quantity of data bearers are established, wasting network resources, and reducing a quantity of wearable devices and terminal devices that can be supported by a network.

SUMMARY

Embodiments of the present invention provide a receive end determining method, a related device, and a communications system, to reduce a quantity of bearers and save network resources.

The communications system in the embodiments of the present invention includes a base station, a terminal device, and a wearable device. It should be noted that the terminal device in the embodiments of the present invention may be a device that provides voice and/or data connectivity for a user, a handheld device having a wireless connection function, or another processing device connected to a wireless modem. The terminal device may communicate with one or more core networks through a radio access network (RAN), and the terminal device has a relay function. For example, the terminal device may be a smartphone or a computer with a mobile terminal, or may be a portable, pocket-sized, handheld, computer built-in, or in-vehicle mobile apparatus that exchanges voice and/or data with the radio access network. The wearable device may communicate with the core network via the base station by using the terminal device. In the embodiments of the present invention, an example in which the terminal device is a smartphone may be used for description. There are two manners of establishing a communications link to the base station by the wearable device: (1) The wearable device directly establishes a communications link to the base station; and (2) the wearable device establishes a connection to the base station by using the relay terminal device. The present invention is implemented in the manner (2).

According to a first aspect, an embodiment of the present invention provides a receive end determining method. Data transmission includes transmission of uplink data and transmission of downlink data in terms of data transmission direction. In transmission of uplink data, a transmit end of the data is a wearable device, and a destination receive end of the data may be a base station, a terminal device, or a combination of the terminal device and the base station. To reduce a quantity of bearers and save network resources, a first multiplex bearer is established between the terminal device and the wearable device. The first multiplex bearer may transmit data in different data directions between the wearable device and a first device, and the first device may alternatively be understood as destination receive end of different kinds. The terminal device receives, by using the first multiplex bearer, data sent by the wearable device. The data may be in three directions, that is, there may be three types of destination receive ends. In this embodiment of the present invention, data of different destination receive ends is distinguished by using indication information carried in the data. The indication information is used to indicate which device a destination receive end of the data is specifically. The destination receive end may be the base station, the terminal device, or the combination of the terminal device and the base station. In this way, when receiving the data, the terminal device may determine the destination receive end of the data based on the indication information in the data. The foregoing provides a description of a method for determining a receive end for uplink data. Actually, a principle of a method for determining a receive end for downlink data is the same as that of the method for determining a receive end for uplink data. The following describes the method for determining a receive end for downlink data. A second multiplex bearer is established between the terminal device and the base station. The second multiplex bearer is used to transmit data between the base station and a second device, and the second device may alternatively be understood as destination receive end of different kinds. The second device includes the wearable device, the terminal device, or a combination of the terminal device and the wearable device. The terminal device receives, by using the second multiplex bearer, data sent by the base station. The data carries indication information, and the indication information is used to indicate that a destination receive end is the terminal device, the wearable device, or the combination of the terminal device and the wearable device. In this way, the terminal device may determine the destination receive end based on the indication information carried in the data.

In this embodiment of the present invention, a multiplex bearer is established to transmit data to different destination receive ends, different indication information in the data is used to distinguish between the different destination receive ends, and there is no need to establish or reconfigure different bearers for the different receive ends. The terminal device determines a destination receive end of data based on indication information carried in the data. In this way, a quantity of bearers is effectively reduced, network resources are saved, a quantity of devices that can be supported by a network is increased, and impact on the bearer is reduced when a data direction is changed.

Optionally, in an uplink data transmission process, after the terminal device determines the destination receive end, and when the destination receive end is the base station or the combination of the terminal device and the base station, the terminal device needs to transmit the data to the base station. Alternatively, in a downlink data transmission process, after the terminal device determines the destination receive end, and when the destination receive end is the wearable device or the combination of the terminal device and the wearable device, the terminal device needs to transmit the data to the wearable device.

In a possible implementation, a specific method for determining the destination receive end by the terminal device based on the indication information may be: The terminal device obtains the indication information from a reserved field or a new field of the data, and the terminal device determines the destination receive end based on the indication information.

In another possible implementation, the indication information may alternatively be an address of the destination receive end, and the terminal device determines the destination receive end based on the address carried in the data. When the destination receive end is the terminal device, the address in the data is an address of the terminal device. When the destination receive end is the base station, the address in the data is an address of the base station. When the destination receive end is the combination of the terminal device and the base station, the address of the destination receive end is a combined address of the terminal device and the base station. The combined address may be understood as an address space. The address space does not overlap with an address space of the terminal device or an address space of the base station. In other words, addresses in the address space do not belong to the address space of the terminal device or the address space of the base station. The address space is the combined address of the base station and the terminal device. Similarly, in the downlink data transmission process, when the destination receive end is the combination of the terminal device and the wearable device, the address of the destination receive end is a combined address of the terminal device and the wearable device.

In another possible implementation, the indication information may alternatively be an identity of the wearable device. The wearable device may have three different data transmission modes. A first transmission mode is defined as transmitting data to the terminal device by the wearable device. A second transmission mode is defined as transmitting data to the base station by the wearable device. A third transmission mode is defined as transmitting data to the terminal device and the base station by the wearable device. Each transmission mode has a preconfigured correspondence to a destination receive end. The terminal device receives a mode request sent by the wearable device. The mode request includes the identity of the wearable device and transmission mode information. The terminal device establishes a correspondence between the identity of the wearable device and the destination receive end based on the mode request. In this case, when the terminal device receives the data, the terminal device may determine the destination receive end based on the identity of the wearable device and the correspondence between the identity of the wearable device and the destination receive end. If the transmission mode does not change, the destination receive end of the data transmitted by the wearable device does not change. If the wearable device needs to change the destination receive end of the data, the wearable device sends a transmission mode request to the terminal device. The mode request includes the identity of the wearable device and transmission mode information, and the mode request is used to make the terminal device re-establish a correspondence between the identity of the wearable device and a destination receive end based on the correspondence. User operations are simple and flexible, improving user experience.

In another possible implementation, the indication information is data service type information. Specifically, a service type includes text information, picture information, voice information, or the like. It can be understood that the wearable device may preconfigure a correspondence between service types and destination receive ends. The terminal device determines, based on the pre-stored correspondence between data service type information and destination receive ends, the destination receive end corresponding to the data.

Optionally, different keys are used for data of different receive ends. The terminal device processes, by using a corresponding key, the data based on the destination receive end. Different keys are used for different destination receive ends, thereby greatly improving data security.

In the foregoing, the destination receive end is determined by using the indication information in the data. In the following, the present invention provides two methods for determining a destination receive end by using a bearer.

According to a second aspect, an embodiment of the present invention provides a receive end determining method. In the method, a destination receive end is determined by using a bearer. The specific method is as follows: A multiplex bearer is established between a terminal device and a wearable device, where the multiplex bearer is used to transmit data between the wearable device and the destination receive end, and the destination receive end includes a base station, the terminal device, or a combination of the terminal device and the base station. The terminal device receives a mode request sent by the wearable device, where the mode request further includes transmission mode information. The terminal device establishes a correspondence between the multiplex bearer and the destination receive end based on a preconfigured correspondence between transmission mode information and destination receive ends. When the terminal device receives, by using the multiplex bearer, data sent by the wearable device, the terminal device determines the destination receive end of the data based on the multiplex bearer and the correspondence between the multiplex bearer and the destination receive end. The terminal device sends the data to the destination receive end.

In this embodiment of the present invention, a multiplex bearer is established between the terminal device and the wearable device. The multiplex bearer is corresponding to one transmission mode. Therefore, the terminal device can determine a current transmission mode of the data by recognizing the multiplex bearer, and can determine a first destination receive end of the data by using a correspondence between the transmission mode and the first destination receive end. If the destination receive end of the data needs to be changed, the wearable device may send a mode request to the terminal device, where the mode request includes information about a second transmission mode. The terminal device determines, based on a correspondence between the information about the second transmission mode and a second destination receive end, that the destination receive end of the data transmitted on the multiplex bearer is the second destination receive end. In this way, a quantity of bearers is effectively reduced, network resources are saved, and a quantity of devices that can be supported by a network is increased.

According to a third aspect, an embodiment of the present invention provides a receive end determining method. In the method, a destination receive end is determined by using a bearer. The specific method is as follows: A service bearer is established between a terminal device and a wearable device based on a service. A bearer may be established between the terminal device and the wearable device based on a service type. There are a plurality of services. The following uses three services for description. The wearable device configures a correspondence between three service types and destination receive ends of data, and sends the correspondence between service types and destination receive ends to the terminal device in a process of establishing the bearer between the wearable device and the terminal device. A service type is corresponding to a destination receive end. For example, the service bearer established between the terminal device and the wearable device is a first service bearer, and the first service bearer is used to transmit picture information. The terminal device receives, by using the service bearer, data sent by the wearable device, and the terminal device determines the destination receive end of the data based on the service bearer. It can be understood that, the wearable device initiates a service request based on a service type, and after the terminal device receives the service request, the terminal device feeds back a response to the wearable device. Therefore, the terminal device may learn of a specific type of service initiated by the wearable device. For example, the terminal device learns that the first service bearer is corresponding to transmission of picture information. In this embodiment of the present invention, the wearable device preconfigures the correspondence between service types and destination receive ends, and the destination receive end of the data on the service bearer is determined when the service bearer is established between the wearable device and the terminal device. Therefore, there is no need to distinguish between data directions to establish or reconfigure different bearers, saving network resources.

According to a fourth aspect, an embodiment of the present invention provides a computer storage medium, configured to store a computer software instruction used by the foregoing terminal device. The computer software instruction includes a program designed for implementing the foregoing aspects.

According to a fifth aspect, an embodiment of the present invention provides a terminal device that has a function of implementing the operations performed by the terminal device in the foregoing method. The function may be implemented by using hardware or by executing corresponding software by hardware. The hardware or software includes one or more modules corresponding to the function.

According to a sixth aspect, a structure of a terminal device includes a memory, a transceiver, and a processor. The memory is configured to store computer executable program code, and is coupled to the transceiver. The program code includes an instruction. When the processor executes the instruction, the instruction makes the terminal device execute the operations or the steps in the foregoing methods.

According to a seventh aspect, an embodiment of the present invention provides a receive end determining method. In an uplink data transmission process, a first multiplex bearer is established between a wearable device and a terminal device, where the first multiplex bearer is used to transmit data between the wearable device and a first device, and the first device includes a base station, the terminal device, or a combination of the terminal device and the base station; the wearable device sends data to the terminal device by using the first multiplex bearer, where the data includes indication information, and the indication information is used to indicate that a destination receive end is the base station, the terminal device, or the combination of the terminal device and the base station.

In this embodiment of the present invention, a multiplex bearer is established to transmit data to different destination receive ends, different indication information in the data is used to distinguish between the different destination receive ends, and there is no need to establish or reconfigure different bearers for the different receive ends. The terminal device determines a destination receive end of data based on indication information carried in the data. In this way, a quantity of bearers is effectively reduced, network resources are saved, a quantity of devices that can be supported by a network is increased, and impact on the bearer is reduced when a data direction is changed.

In a possible implementation, the wearable device determines the destination receive end of the data. For different destination receive ends, indication information carried in the data is different. The wearable device adds the indication information to a reserved field or a new field of the data based on the destination receive end. The wearable device may send the data to the terminal device by using the first multiplex bearer.

In another possible implementation, when the destination receive end is the terminal device, the wearable device encapsulates an address of the terminal device. When the destination receive end is the base station, the wearable device encapsulates an address of the base station. It should be noted that, when the destination receive end is the combination of the terminal device and the base station, a special address needs to be defined. The special address is a combined address of the base station and the terminal device, and is used to indicate addresses of the terminal device and the base station. For example, the special address is an address space. The address space does not overlap with an address space of the terminal device or an address space of the base station. In other words, addresses in the address space do not belong to the address space of the terminal device or the address space of the base station. The address space is the combined address of the base station and the terminal device. In this embodiment of the present invention, the data includes address information, and a special case is that the data includes the combined address of the terminal device and the base station. Therefore, when the destination terminal is the base station or the terminal device, a processing step in which the wearable device encapsulates additional indication information into the data is not required, simplifying a processing process executed by the wearable device.

In another possible implementation, the indication information is an identity of the wearable device. The wearable device has three different data transmission modes, and each transmission mode has a preconfigured correspondence to a destination receive end. A first transmission mode is defined as transmitting data to the terminal device by the wearable device. A second transmission mode is defined as transmitting data to the base station by the wearable device. A third transmission mode is defined as transmitting data to the terminal device and the base station by the wearable device. The wearable device determines transmission mode information of the data based on the destination receive end. The wearable device sends a mode request to the terminal device, where the mode request includes the identity of the wearable device and the transmission mode information. The wearable device adds the identity of the wearable device to a corresponding field of the data, and the wearable device sends the data to the terminal device by using the first multiplex bearer. In this way, the terminal device establishes a correspondence between the identity of the wearable device and the destination receive end. When receiving the data, the terminal device may determine the destination receive end of the data based on the identity of the wearable device.

In another possible implementation, the indication information is data service type information. The wearable device determines the data service type information, the wearable device adds the data service type information to a corresponding field of the data, and the wearable device sends the data to the terminal device by using the multiplex bearer.

In another possible implementation, different keys are used for data of different receive ends, and the wearable device processes, by using a corresponding key, the data based on the destination receive end of the data, greatly improving data security.

According to an eighth aspect, an embodiment of the present invention provides a computer storage medium, configured to store a computer software instruction used by the foregoing wearable device. The computer software instruction includes a program designed for implementing the foregoing aspect.

According to a ninth aspect, an embodiment of the present invention provides a wearable device. The wearable device has a function of implementing the operations performed by the wearable device in the foregoing method. The function may be implemented by using hardware or by executing corresponding software by hardware. The hardware or software includes one or more modules corresponding to the function.

According to a tenth aspect, an embodiment of the present invention provides a wearable device. The wearable device includes a memory, a transceiver, and a processor. The memory is configured to store computer executable program code, and is coupled to the transceiver. The program code includes an instruction. When the processor executes the instruction, the instruction makes the wearable device execute the operations or the steps in the foregoing method.

According to an eleventh aspect, an embodiment of the present invention provides a receive end determining method. In a downlink data transmission process, a second multiplex bearer is established between a base station and a terminal device, the second multiplex bearer is used to transmit data between the base station and a second device, and the second device may alternatively be understood as destination receive end of different kinds. The second device includes a wearable device, the terminal device, or a combination of the terminal device and the wearable device. The base station sends data to the terminal device by using the second multiplex bearer. The data carries indication information, and the indication information may be used to indicate that a destination receive end is the terminal device, the wearable device, or the combination of the terminal device and the wearable device.

In this embodiment of the present invention, a multiplex bearer is established to transmit data to different destination receive ends, different indication information in the data is used to distinguish between the different destination receive ends, and there is no need to establish or reconfigure different bearers for the different receive ends. The terminal device determines a destination receive end of data based on indication information carried in the data. In this way, a quantity of bearers is effectively reduced, network resources are saved, a quantity of devices that can be supported by a network is increased, and impact on the bearer is reduced when a data direction is changed.

Optionally, the base station determines the destination receive end of the data. For different destination receive ends, indication information is different. After determining the destination receive end, the base station determines indication information carried in the data. The base station adds the indication information to a reserved field or a new field of the data based on the destination receive end. Then, the base station sends the data to the terminal device, so that the terminal device may determine the destination receive end of the data.

In a possible implementation, the indication information is an address of the destination receive end. When the destination receive end is the combination of the terminal device and the wearable device, the address of the destination receive end is a combined address of the terminal device and the wearable device. The combined address may be understood as an address space. The address space does not overlap with an address space of the terminal device or an address space of the wearable device. In other words, addresses in the address space do not belong to the address space of the terminal device or the address space of the wearable device. The address space is the combined address of the wearable device and the terminal device.

In another possible implementation, the indication information is data service type information. The base station determines the data service type information based on the destination receive end. A service type includes text information, picture information, voice information, or the like. It can be understood that the base station may preconfigure a correspondence between service types and destination receive ends. The base station determines the data service type information, the base station adds the data service type information to a corresponding field of the data, and the base station sends the data to the terminal device. In this way, the terminal device may determine the destination receive end of the data based on the received service type information and the pre-stored correspondence between service type information and destination receive ends.

In another possible implementation, different keys are used for data of different destination receive ends, and the base station processes, by using a corresponding key, the data based on the destination receive end of the data, greatly improving data security.

According to a twelfth aspect, an embodiment of the present invention provides a computer storage medium, configured to store a computer software instruction used by the foregoing base station. The computer software instruction includes a program designed for implementing the foregoing aspect.

According to a thirteenth aspect, an embodiment of the present invention provides a base station. The base station has a function of implementing the operations performed by the base station in the foregoing method. The function may be implemented by using hardware or by executing corresponding software by hardware. The hardware or software includes one or more modules corresponding to the function.

According to a fourteenth aspect, an embodiment of the present invention provides a base station. The base station includes a memory, a transceiver, and a processor. The memory is configured to store computer executable program code, and is coupled to the transceiver. The program code includes an instruction. When the processor executes the instruction, the instruction makes the base station execute the operations or the steps in the foregoing method.

According to a fifteenth aspect, an embodiment of the present invention provides a communications system, including a terminal device, a wearable device, and a base station. The terminal device is the terminal device provided in the fifth aspect or the sixth aspect. The wearable device is the wearable device provided in the ninth aspect or the tenth aspect. The base station is the base station provided in the thirteenth aspect or the fourteenth aspect.

In the embodiments of the present invention, a multiplex bearer is established to transmit data to different destination receive ends, different indication information in the data is used to distinguish between the different destination receive ends, and there is no need to establish or reconfigure different bearers for the different receive ends. The terminal device determines a destination receive end of data based on indication information carried in the data. In this way, a quantity of bearers is effectively reduced, network resources are saved, a quantity of devices that can be supported by the network is increased, and impact on the bearer is reduced when a data direction is changed.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention without creative efforts shall fall within the protection scope of the present invention.

In the specification, claims, and accompanying drawings of the present invention, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments of the present invention described herein can be implemented in other orders different from the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
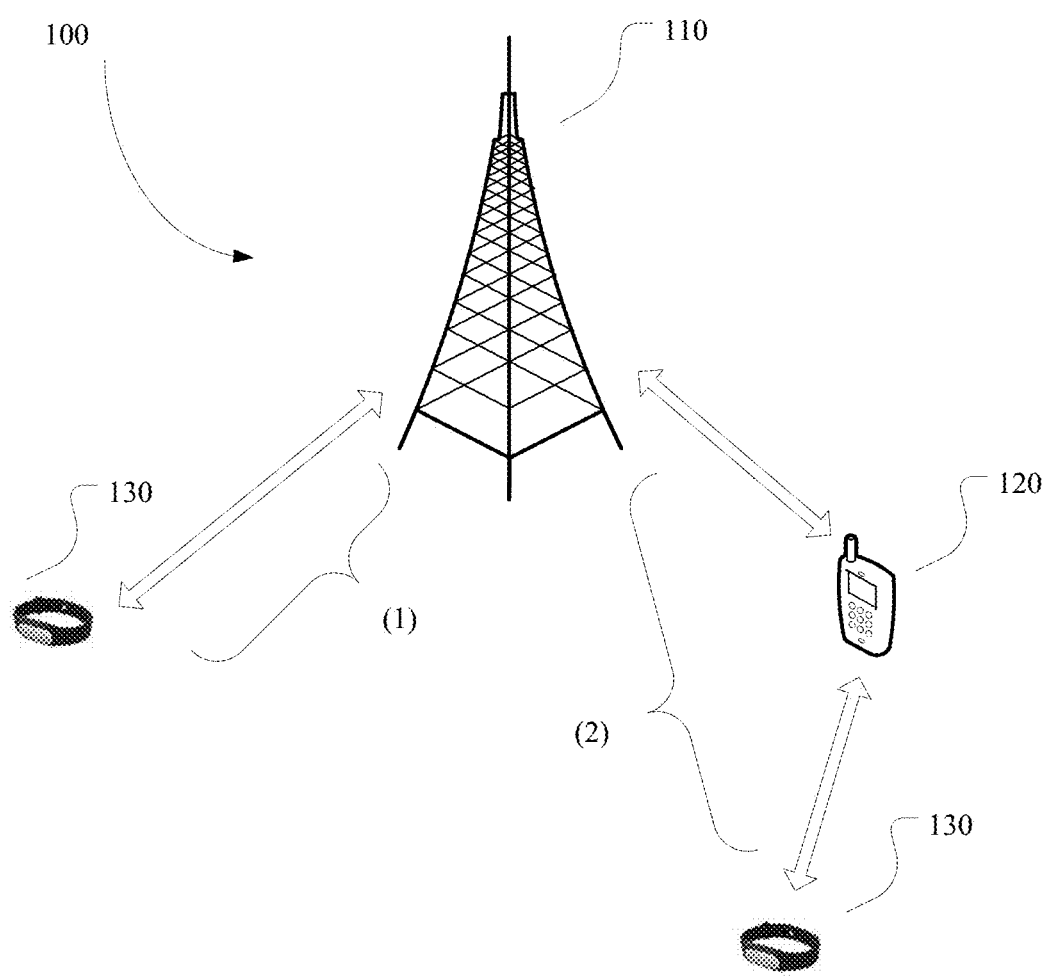
FIG. 1 is a schematic block diagram of a communications system according to an embodiment of the present invention.

Referring to a block diagram of a network system 100 shown in FIG. 1, the network system 100 includes a base station 110, a terminal device 120, and a wearable device 130. It should be noted that the terminal device 120 in an embodiment of the present invention may be a device that provides voice and/or data connectivity for a user, a handheld device having a wireless connection function, or another processing device connected to a wireless modem. The terminal device 120 may communicate with one or more core networks through a radio access network (RAN). The terminal device 120 may be a smartphone or a computer with a mobile terminal, and the terminal device 120 has a relay function. For example, the terminal device 120 may be a portable, pocket-sized, handheld, computer built-in, or in-vehicle mobile apparatus that exchanges voice and/or data with the radio access network. In this case, the wearable device 130 may communicate with the core network via the base station by using the terminal device 120. In this embodiment of the present invention, an example in which the terminal device is a smartphone may be used for description.

Figure 2:
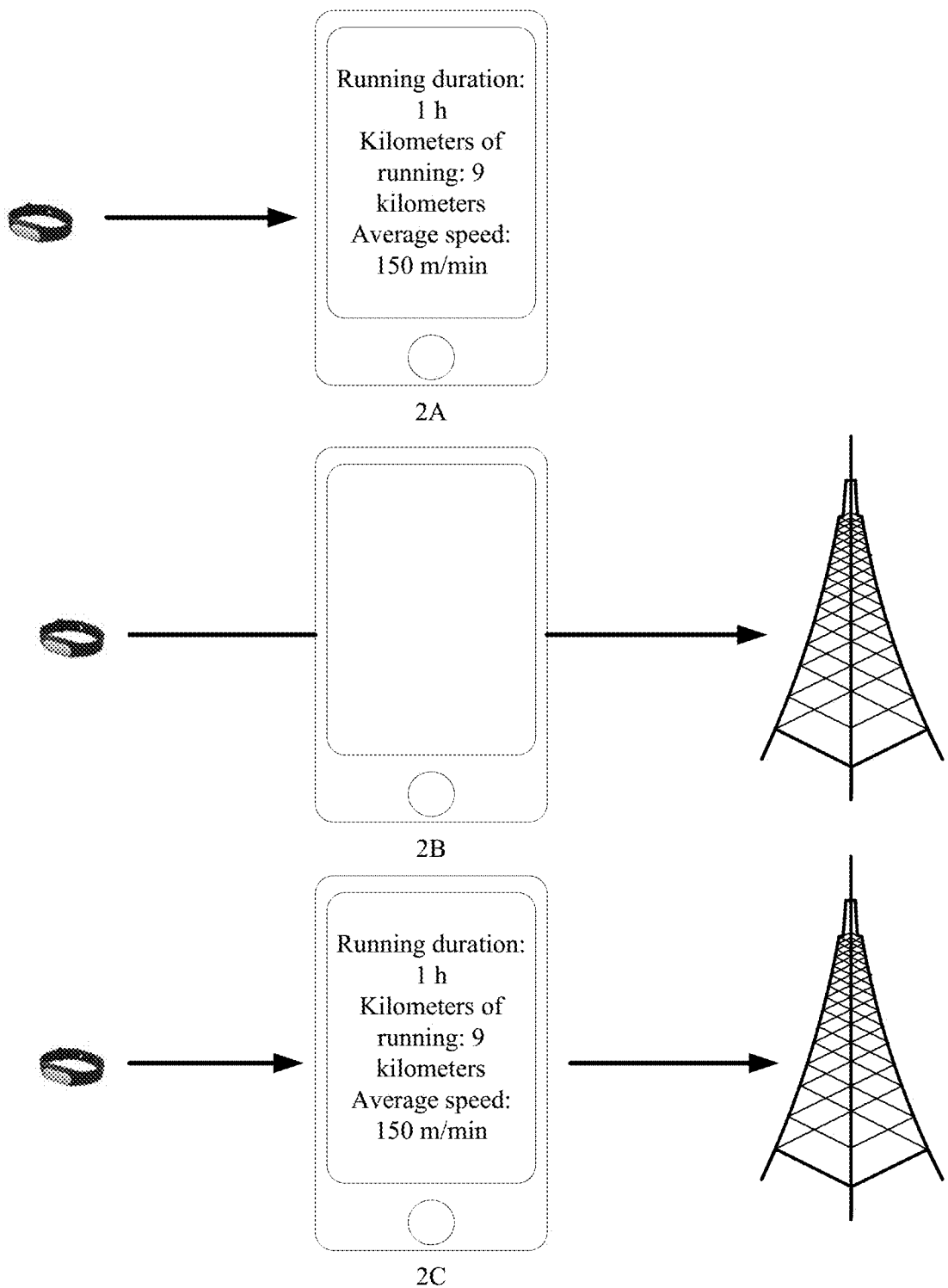
FIG. 2 is a schematic data direction diagram according to an embodiment of the present invention.

It should be noted that, data sent by the wearable device and/or the terminal device to the network usually needs to be sent to the base station first, or data sent by the network to the wearable device and/or the terminal device also usually needs to be sent via the base station. In this embodiment of the present invention, the base station is used as an example to describe data interaction between the wearable device and/or the terminal device and the network. There are two manners of establishing a communications link to the base station 110 by the wearable device 130: (1) The wearable device 130 directly establishes a communications link to the base station 110; and (2) the wearable device establishes a connection to the base station by using the relay terminal device 120. The present invention is implemented in the manner (2). When the wearable device 130 is connected to the terminal device 120, there are three data directions. Uplink data is used as an example for description. FIG. 2 shows a schematic data direction diagram in which 2A, 2B, and 2C are corresponding to the following three cases: a, b, and c, respectively.

a. The wearable device sends data to the terminal device, that is, a receive end of the data is the terminal device.

b. The wearable device sends data to the base station, that is, a receive end of the data is the base station. However, the data needs to be forwarded by the terminal device.

c. The wearable device sends data to the terminal device and the base station, that is, destination receive ends of the data are both the terminal device and the base station. Both the terminal device and the base station need to process the data.

For ease of understanding, the following describes differences between the three cases a, b, and c by using an example. For example, with reference to FIG. 2, the wearable device is a band, the terminal device is a mobile phone, and the band records sports data of a user obtained from 7 o'clock to 8 o'clock on an evening of February 12. The sports data includes running duration, corresponding kilometers of running, and an average speed, or walking duration, corresponding kilometers of walking, and an average speed. In the case a, the band sends the sports data to the terminal device, and the destination receive end of the data is the mobile phone. After receiving the sports data sent by the band, the mobile phone displays the sports data. In the case b, the mobile phone does not process the data, but forwards the sports data to the base station. The data is stored on the network. In the case c, the band sends the sports data to the mobile phone, and the mobile phone displays the sports data, so that the user may see the sports data. In addition, the mobile phone sends the sports data to the base station. The data is stored on the network.

In this embodiment of the present invention, a multiplex bearer is established between the wearable device and the terminal device, and the multiplex bearer is used to transmit data in the foregoing three data directions between the wearable device and the terminal device. In other words, there is no longer a need to establish three different bearers between the wearable device and the terminal device to transmit data in different directions. Instead, indication information carried in the data is used to distinguish between different data directions. That is, after the bearer is established between the wearable device and the terminal device, the terminal device receives the data transmitted on the bearer, and the terminal device may distinguish between destination receive ends of the data based on the indication information carried in the data, or directly determines a data direction (destination receive end) by using the bearer. According to the present invention, a quantity of bearers is effectively reduced, network resources are saved, and a quantity of devices supported by the network is increased. The following specifically describes the present invention by using embodiments.

1. Different destination receive ends are determined by using indication information carried in data.

Figure 3:
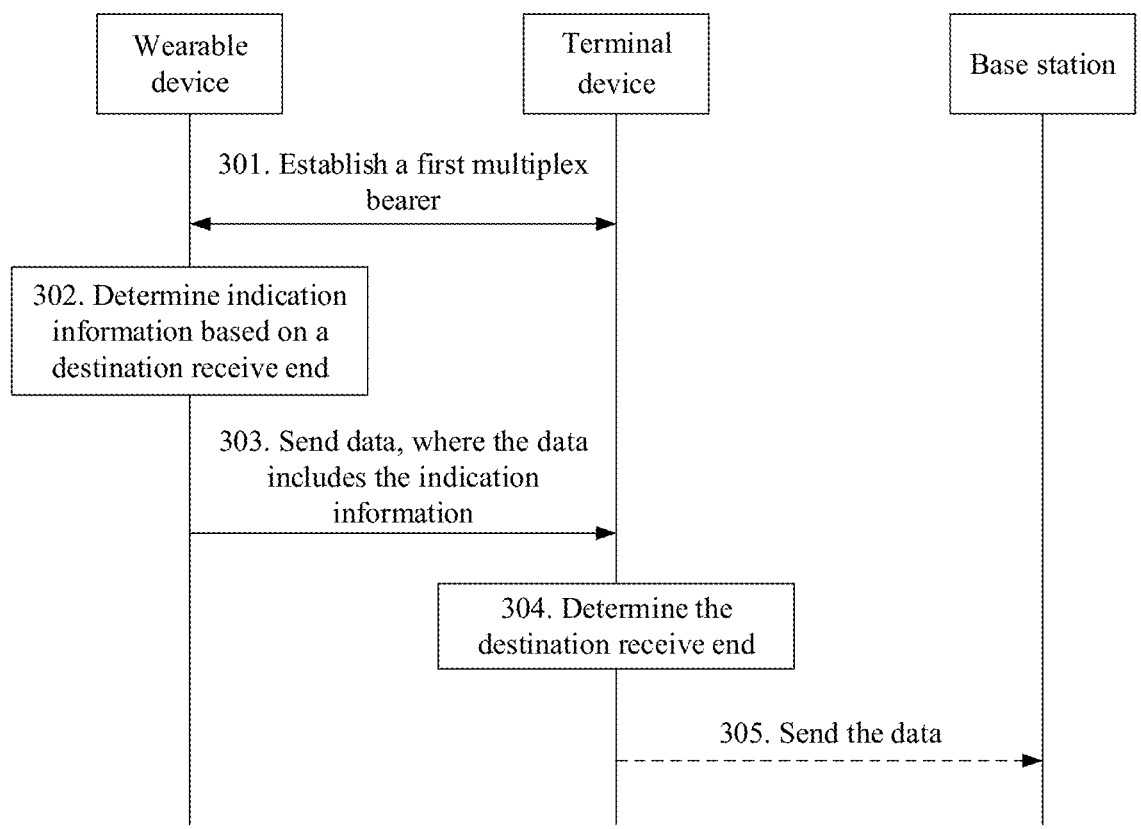
FIG. 3 is a schematic diagram of an embodiment of a receive end determining method according to an embodiment of the present invention.

Referring to FIG. 3, the embodiments of the present invention provide an embodiment of a receive end determining method. The method includes the following steps.

Step 301. Establish a first multiplex bearer between a terminal device and a wearable device.

The first multiplex bearer is used to transmit data that is from the wearable device to a first device, and the first device includes a terminal device, or a base station, or a combination of the terminal device and the base station.

Specific steps of establishing the first multiplex bearer between the terminal device and the wearable device include the following:

Step e. The wearable device sends a connection request to the terminal device.

Step f. After receiving the connection request, the terminal device sends a connection establishment response to the wearable device.

Step g. After receiving the response, the wearable device sends a connection complete message to the terminal device.

After the first multiplex bearer is established between the terminal device and the wearable device, data in three different directions is transmitted by using the first multiplex bearer. For the data in three different directions, refer to FIG. 2 for understanding. The data in three different directions includes the following cases:

a. A destination receive end of data is the terminal device, that is, the data is transmitted from the wearable device to the terminal device.

b. A destination receive end of data is the base station, that is, the data is transmitted from the wearable device to the terminal device, and transmitted to the base station after being forwarded by the terminal device.

c. A destination receive end of data is the combination of the terminal device and the base station, that is, the data is transmitted from the wearable device to the terminal device, and the terminal device processes the data and sends the data to the base station.

Step 302. The wearable device determines indication information based on a destination receive end of data.

The wearable device determines, based on the destination receive end of the data, the indication information that needs to be carried in the data, and adds the indication information to a reserved field or a new field of the data. For different destination receive ends, indication information carried in the data is different. Specifically, the indication information may have different forms. Optionally, in a first example, the indication information may be a destination address. When the destination receive end is the terminal device, that is, in the case a in step 301, the wearable device encapsulates an address of the terminal device. In the case b in step 301, when the destination receive end is the base station, the wearable device encapsulates an address of the base station. It should be noted that, when the destination receive end is the combination of the terminal device and the base station, that is, in the case c in step 301, a special address needs to be defined. The special address is a combined address of the base station and the terminal device, and is used to indicate addresses of the terminal device and the base station. For example, the special address is an address space. The address space does not overlap with an address space of the terminal device or an address space of the base station. In other words, addresses in the address space do not belong to the address space of the terminal device or the address space of the base station. The address space is the combined address of the base station and the terminal device.

Optionally, in a second example, the wearable device adds the indication information to the reserved field or the new field of the data based on the destination receive end. For example, a flag of a "03" flag bit of the reserved field is "00", indicating that the destination receive end of the data is the terminal device; a flag of a "03" flag bit of the reserved field is "01", indicating that the destination receive end of the data is the base station; a flag of a "03" flag bit of the reserved field is "10", indicating that destination receive ends of the data are the terminal device and the base station. It can be understood that, the special address in the first example may alternatively be indicated by using the flag bit in the reserved field or the new field in this example. The flags of the flag bit in this example, such as "01" and "00", are merely examples for description, but not for limitation. For example, a correspondence between flags of a flag bit and destination receive ends is shown in the following table.

TABLE 1

| Flag of a flag bit | Destination receive end |
|---|---|
| "00" | Terminal device |
| "01" | Base station |
| "10" | Terminal device and base station |

Optionally, in a third example, the indication information is current mode information of the wearable device. The wearable device determines the current mode information based on the destination receive end, and the wearable device adds the current mode information to a corresponding field of the data. The corresponding field may be the reserved field of the data or the new field of the data. This is not limited herein.

When the indication information is the mode information, the receive end determining method may be applied to the following scenarios.

The wearable device has three different data transmission modes, and each of the three data transmission modes has a preconfigured correspondence to a destination receive end. The correspondence is shown in the following Table 2.

TABLE 2

| Transmission mode | Destination receive end |
|---|---|
| First transmission mode | Terminal device |
| Second transmission mode | Base station |
| Third transmission mode | Terminal device and base station |

The first transmission mode is defined as transmitting data to the terminal device by the wearable device.

The second transmission mode is defined as transmitting data to the base station by the wearable device.

The third transmission mode is defined as transmitting data to the terminal device and the base station by the wearable device.

To understand the foregoing three transmission modes, refer to the three data directions in step 301. A transmission mode and a data direction have a same nature but different representations, because the transmission mode is defined by using a transmit end (for example, the wearable device) of data as a main body, but the data direction is defined by using the data as the main body. Regardless of a representation, the transmission mode and the data direction have the same nature, and both shall fall within the protection scope of the present invention.

Specifically, before receiving the data sent by the wearable device, the terminal device needs to learn of the correspondence between the three transmission modes of the wearable device and the destination receive ends. Specifically, during establishment of the first multiplex bearer between the wearable device and the terminal device, the correspondence may be notified to the terminal device by using a status parameter sent by the wearable device to the terminal device. Details are as follows.

Step h. The wearable device sends, to the terminal device, a connection request for establishing a bearer.

The connection request carries an identity of the wearable device and a first status parameter, and the first status parameter includes the correspondence, in Table 2, between the transmission modes of the wearable device and the destination receive ends. Further, the wearable device may mark one of the three transmission modes. For example, the wearable device marks the first transmission mode, indicating that the first transmission mode is a current transmission mode in which the wearable device transmits data. It can be understood as follows: If the transmission mode of the wearable device does not change, the destination receive end of the data transmitted by the wearable device is the terminal device.

Step i. After receiving the connection request, the terminal device sends a connection establishment response to the wearable device.

The terminal device performs associative storage of the identity of the wearable device and the correspondence based on the received identity of the wearable device and the received status parameter.

Step j. After receiving the response, the wearable device sends a connection complete message to the terminal device.

In this example, if the transmission mode does not change, the destination receive end of the data transmitted by the wearable device does not change. If the wearable device needs to change the destination receive end of the data, the wearable device sends a transmission mode request to the terminal device. The mode request includes the identity of the wearable device and transmission mode information, and the mode request is used to make the terminal device re-establish a correspondence between the identity of the wearable device and a destination receive end based on the correspondence in Table 2.

Optionally, in a fourth example, the indication information is data service type information. Specifically, the wearable device determines the data service type information based on the destination receive end. A service type includes text information, picture information, voice information, or the like. It can be understood that the wearable device may preconfigure a correspondence between service types and destination receive ends. The correspondence is shown in the following Table 3.

TABLE 3

| Service type | Destination receive end |
|---|---|
| Sports data information | Terminal device |
| Picture information | Base station |
| Text information | Terminal device and base station |

For example, the wearable device sends the sports data information to the terminal device, and the wearable device adds service type information to a corresponding field of a data packet. The service type information is used to indicate that the data packet sent to the terminal device is the sports data information.

Step 303. The wearable device sends the data to the terminal device by using the first multiplex bearer, where the data includes the indication information used to indicate the destination receive end.

Step 304. The terminal device receives, by using the first multiplex bearer, the data sent by the wearable device, and determines the destination receive end based on the indication information.

The data sent by the wearable device and received by the terminal device includes the indication information. In the first example in step 302, when the indication information is a destination address, the terminal device determines, by using the destination address, whether the data is data sent to the terminal device. An example in which the wearable device transmits sports data is still used for description. If determining that the destination address is the address of the terminal device, the terminal device processes the sports data, for example, displays and/or stores the sports data. If determining that the destination address is the address of the base station, the terminal device does not need to process the sports data and directly forwards the sports data to the base station. It should be noted that, if the terminal device determines that the destination address is a special address, the terminal device pre-stores the special address. The terminal device displays and/or stores the sports data, and sends the sports data to the base station.

Optionally, in the second example in step 302, the terminal device pre-stores the correspondence, in Table 1, between flags of a flag bit and destination receive ends. For example, the terminal device determines the destination receive end based on the correspondence between flags of the "03" flag bit in the reserved field or the new field of the data and destination receive ends. For a data processing manner of the terminal device, refer to the description of the first example in this step for understanding, and details are not repeated herein.

Optionally, in the third example in step 302, when the indication information is the identity of the wearable device, during establishment of the bearer between the terminal device and the wearable device, the terminal device receives the correspondence in Table 2 and the identity of the wearable device and performs corresponding storage. The terminal device determines the destination receive end based on the current mode information of the data and the correspondence in Table 2.

Specifically, the terminal device receives a mode request sent by the wearable device, and the mode request includes transmission mode information and the identity of the wearable device. For example, the current transmission mode information indicates the first transmission mode, indicating that the wearable device is in the first transmission mode.

The terminal device records information about the first transmission mode, and sends a response to the wearable device.

The terminal device receives data sent by the wearable device. The data includes the identity of the wearable device. If identifying the identity, the terminal device may determine that the wearable device is currently in the first transmission mode, and further determine, based on the correspondence in Table 2, that the destination receive end of the data is the terminal device. It should be noted that, when identifying the identity of the wearable device based on data subsequently received by the terminal device, the terminal device still sends the data to a higher layer of the terminal device.

If the terminal device receives again a mode request sent by the wearable device, where the mode request includes the identity of the wearable device and current transmission mode information, when the transmission mode information indicates the second transmission mode and the terminal device determines that the transmission mode information received this time is different from the transmission mode information received last time, the terminal device marks the transmission mode information received this time as the current transmission mode information, and re-establishes and stores a correspondence between the current transmission mode information and the identity of the wearable device. Then, the terminal device receives data sent by the wearable device. The data includes the identity of the wearable device. The terminal device learns, based on the identity of the wearable device, that the wearable device is currently in the second transmission mode. The terminal device determines, based on the correspondence in Table 2, that the destination receive end of the data is the base station, and then forwards the data to the base station.

Optionally, in the fourth example in step 302, when the indication information is the service type information, the terminal device pre-stores the correspondence, in Table 3, between service types and destination receive ends, the terminal device determines the destination receive end based on the correspondence between data service type information and destination receive ends. For a data processing manner of the terminal device, refer to the description of the first example in this step for understanding, and details are not repeated herein.

Step 305. The terminal device sends the data to the destination receive end.

A destination receive end is the terminal device, the base station, or a combination of the terminal device and the base station. When the destination receive end is the base station or the combination of the terminal device and the base station, the terminal device sends the data to the base station.

When the destination receive end is the terminal device, the terminal device sends the data to a higher layer of the terminal device, so that the terminal device processes the data at the higher layer.

In this step, a bearer between the terminal device and the base station may be established in advance, because the terminal device not only needs to forward the data sent by the wearable device, but also may need to establish a communications service between the terminal device and the base station. If the bearer between the terminal device and the base station is not established in advance, when the terminal device determines that the destination receive end includes the base station, the bearer between the terminal device and the base station is established. Then, the terminal device sends the data to the base station by using the bearer.

In this embodiment of the present invention, the first multiplex bearer is established between the terminal device and the wearable device, and the first multiplex bearer may transmit data of different destination receive ends. Different indication information in the data is used to distinguish between the different destination receive ends, and there is no need to establish or reconfigure different bearers for the different receive ends. The terminal device determines a destination receive end of data based on indication information carried in the data. In this way, a quantity of bearers is effectively reduced, network resources are saved, a quantity of devices that can be supported by a network is increased, and impact on the bearer is reduced when a data direction is changed.

2. Different destination receive ends are determined based on bearers.

Figure 4:
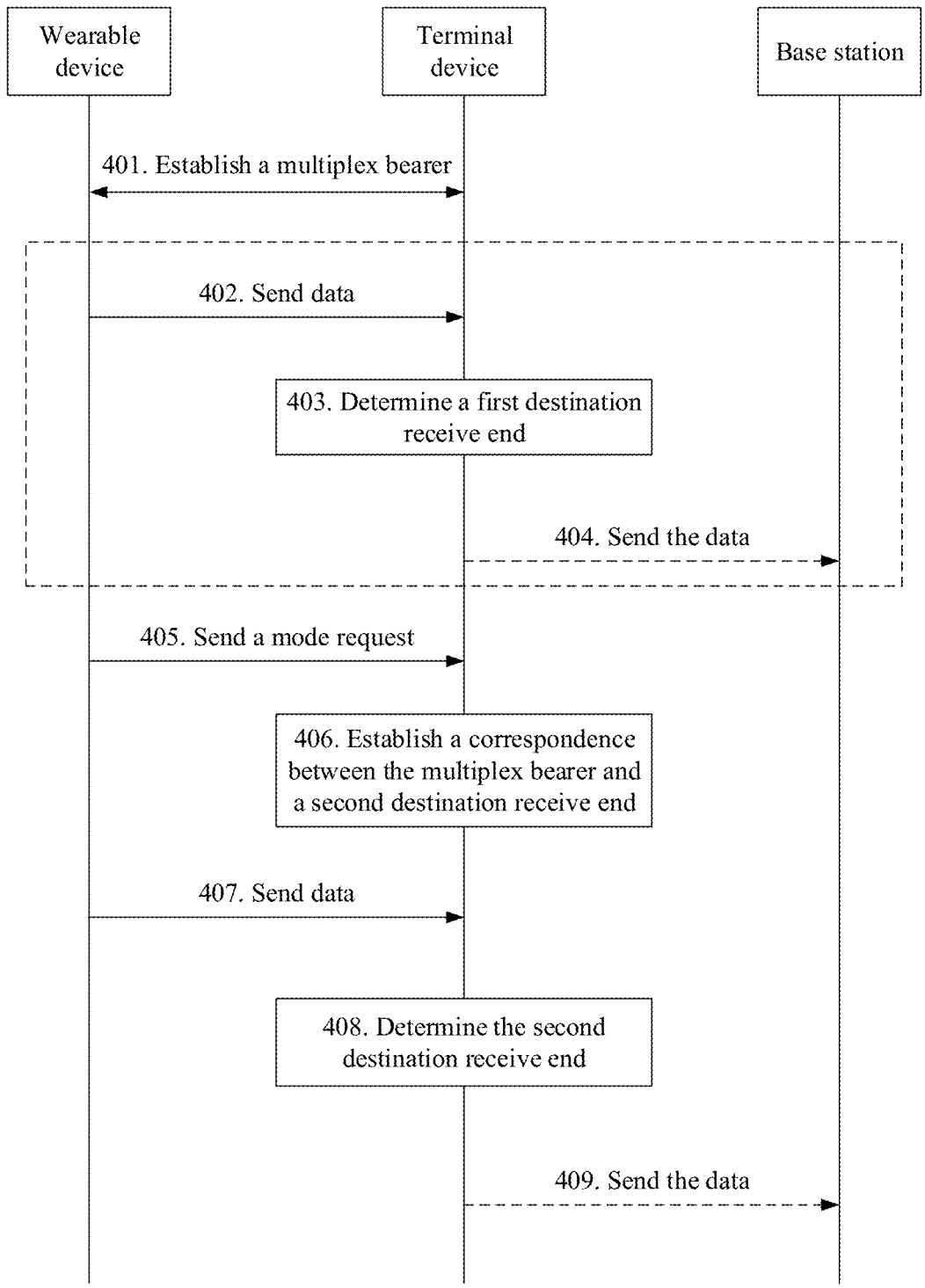
FIG. 4 is a schematic diagram of another embodiment of a receive end determining method according to an embodiment of the present invention.

Referring to FIG. 4, another embodiment of a receive end determining method includes the following steps.

Step 401. Establish a bearer between a terminal device and a wearable device, where the bearer is used to transmit data that is from the wearable device to a destination receive end, and the destination receive end is one of the terminal device, a base station, or a combination of the terminal device and the base station.

The bearer is a multiplex bearer. The wearable device preconfigures a correspondence between three data transmission modes and destination receive ends (as shown in Table 2). The established multiplex bearer is a DRB. The wearable device configures a data transmission mode on the DRB to a first transmission mode. In a process of establishing the bearer between the terminal device and the wearable device, the wearable device notifies the terminal device of a correspondence (as shown in Table 2) between a transmission mode and a first destination receive end and transmission mode information (for example, the first transmission mode).

Step 402. The wearable device sends data to the terminal device by using the bearer.

The wearable device sends the data to the terminal device by using the DRB.

Step 403. The terminal device receives, by using the bearer, the data sent by the wearable device, and the terminal device determines a first destination receive end of the data based on the multiplex bearer.

The terminal device may obtain the correspondence (as shown in Table 2) between transmission modes and destination receive ends in the process of establishing the bearer between the terminal device and the wearable device, or may pre-store the correspondence (as shown in Table 2). A specific manner is not limited herein. In addition, in the process of establishing the bearer between the terminal device and the wearable device, the terminal device learns that a current transmission mode on the DRB is the first transmission mode. The terminal device receives the data transmitted from the DRB, and the terminal device may determine that the destination receive end of the data transmitted on the DRB is the terminal device.

Step 404. The terminal device sends the data to the destination receive end.

Step 405. The wearable device sends a mode request to the terminal device, where the mode request includes information about a second transmission mode.

If the wearable device needs to change a data direction of data transmission on the DRB, for example, the original destination receive end of the data transmitted by using the DRB is the terminal device, and a current destination receive end of data transmitted by using the DRB changes to the base station, the wearable device sends the mode request to the terminal device.

It should be noted that step 402 to step 404 are optional steps and may not be performed. After step 401, step 405 is directly performed. The wearable device may directly send the mode request to the terminal device. The information, included in the mode request, about the second transmission mode is used to indicate, to the terminal device, that a current transmission mode of the wearable device is the second transmission mode.

Step 406. The terminal device receives the mode request, and the terminal device establishes a correspondence between the multiplex bearer and a second destination receive end based on a preconfigured correspondence between transmission mode information and destination receive ends.

For example, the terminal device sets the second transmission mode as the current transmission mode, and establishes the correspondence between the DRB and the second destination receive end based on a correspondence between the second transmission mode and the second destination receive end. For example, the second destination receive end is the base station.

Step 407. The wearable device sends data to the terminal device by using the multiplex bearer.

The terminal device receives the data from the DRB.

Step 408. The terminal device determines a second destination receive end based on the correspondence between the multiplex bearer and the second destination receive end.

Step 409. The terminal device sends the data to the destination receive end.

When the destination receive end is the base station or the combination of the terminal device and the base station, the terminal device sends the data to the base station.

When the destination receive end is the terminal device, the terminal device sends the data to a higher layer of the terminal device.

In this embodiment of the present invention, a multiplex bearer is established between the terminal device and the wearable device. The multiplex bearer is corresponding to one transmission mode. Therefore, the terminal device can determine the current transmission mode of the data by recognizing the multiplex bearer, and can determine the first destination receive end of the data by using the correspondence between the transmission mode and the first destination receive end. If the destination receive end of the data needs to be changed, the wearable device may send the mode request to the terminal device, where the mode request includes the information about the second transmission mode. The terminal device determines, based on the correspondence between the information about the second transmission mode and the second destination receive end, that the destination receive end of the data transmitted on the multiplex bearer is the second destination receive end. In this way, a quantity of bearers is effectively reduced, network resources are saved, and a quantity of devices that can be supported by a network is increased.

Figure 5:
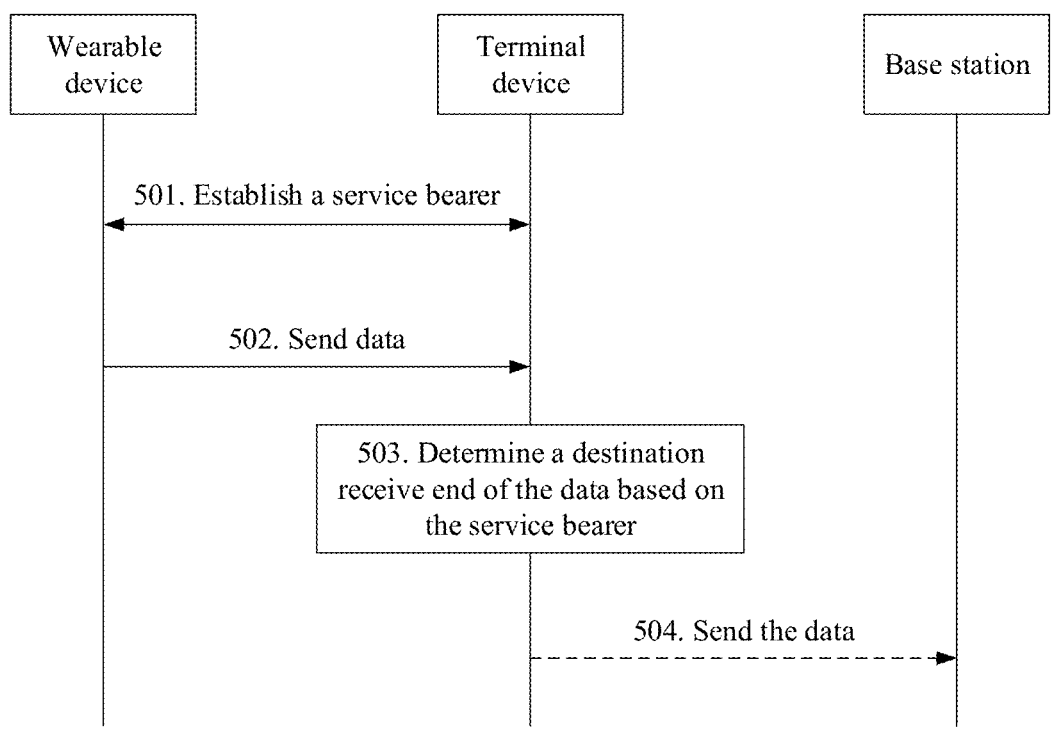
FIG. 5 is a schematic diagram of another embodiment of a receive end determining method according to an embodiment of the present invention.

Referring to FIG. 5, another embodiment of a receive end determining method includes the following steps.

Step 501. Establish a service bearer between a terminal device and a wearable device.

A bearer may be established between the terminal device and the wearable device based on a service type. There are a plurality of services. The following uses three services for description, but in actual application, services are not limited to the three services.

It can be understood that the wearable device sends a service establishment request only when the wearable device needs to initiate a service. For example, in the following scenario, the wearable device is a smartwatch, and the terminal device is a mobile phone. When a user is exercising outdoors wearing the smartwatch, there may mainly be three services. For example, the three services may be a picture information transmission service, a health data transmission service, and a text transmission service. When the user is exercising outdoors wearing the wearable device (e.g. smartwatch), in most cases, health data recorded by the wearable device needs to be sent to the mobile phone, because the user hopes to view the health data on the mobile phone at any time. In addition, when the user is exercising outdoors, the wearable device may shoot a beautiful landscape, the smartwatch sends, to the base station, information about a picture taken, and a network stores the picture information. If the user receives an email in an exercise process, the user sends email information to the mobile phone, and forwards the email to the base station after replying the email on the mobile phone. For the foregoing three services, the user uses a fixed processing manner specific to one service. That is, destination receive ends of data transmission for the three services are the terminal device, the base station, and the terminal device and the base station. In this way, the wearable device configures a correspondence between three service types and destination receive ends of data, and sends the correspondence between service types and destination receive ends to the terminal device in a process of establishing the bearer between the wearable device and the terminal device. The correspondence between service types and destination receive ends is shown in Table 3. In the foregoing example, the service bearer established between the wearable device and the terminal device is a first service bearer, and the first service bearer is used to transmit picture information.

Step 502. The wearable device sends data to the terminal device by using the service bearer.

For example, if the wearable device needs to send picture information, the wearable device sends the picture information to the terminal device by using the first service bearer.

Step 503. The terminal device receives, by using the service bearer, the data sent by the wearable device, and the terminal device determines a destination receive end of the data based on the service bearer.

It can be understood that, the wearable device initiates a service request based on a service type, and after the terminal device receives the service request, the terminal device feeds back a response to the wearable device. Therefore, the terminal device may learn of a specific type of service initiated by the wearable device. For example, the terminal device learns that the first service bearer is corresponding to transmission of picture information. The terminal device may determine, based on the correspondence in Table 3, that the destination receive end of the picture information is the base station.

Step 504. The terminal device sends the data to the destination receive end.

The destination receive end is the base station. The terminal device sends the picture information to the base station.

In this embodiment of the present invention, only one service type is used as an example for description, but methods for determining destination receive ends based on service types are the same. Persons skilled in the art may refer to this embodiment for understanding, and an example of another service type is not described in detail herein.

In this embodiment of the present invention, the wearable device preconfigures the correspondence between service types and destination receive ends, and the destination receive end of the data on the service bearer is determined when the service bearer is established between the wearable device and the terminal device. Therefore, there is no need to distinguish between data directions to establish or reconfigure different bearers, saving network resources.

It should be noted that uplink data transmission is used as an example for description in all the foregoing embodiments. If downlink data is transmitted, that is, a transmission direction of the data is from the base station to the wearable device, for a destination receive end, there are three cases:

m. The destination receive end of the data is the terminal device, that is, the data is transmitted from the base station to the terminal device.

n. The destination receive end of the data is the wearable device, that is, the data is transmitted from the base station to the terminal device, and transmitted to the wearable device after being forwarded by the terminal device.

o. The destination receive end of the data is the combination of the terminal device and the wearable device, that is, the data is transmitted from the base station to the terminal device, and the terminal device processes the data and sends the data to the wearable device.

The solutions in the embodiments of the present invention are applicable to both uplink data transmission and downlink data transmission. The data transmit end in the foregoing embodiments is changed to the base station, and a transmission direction of data changes. Therefore, a downlink data transmission method is essentially the same as the uplink data transmission method. For ease of understanding, the following specifically describes downlink data transmission.

l. Different destination receive ends are determined by using indication information carried in data.

Figure 6:
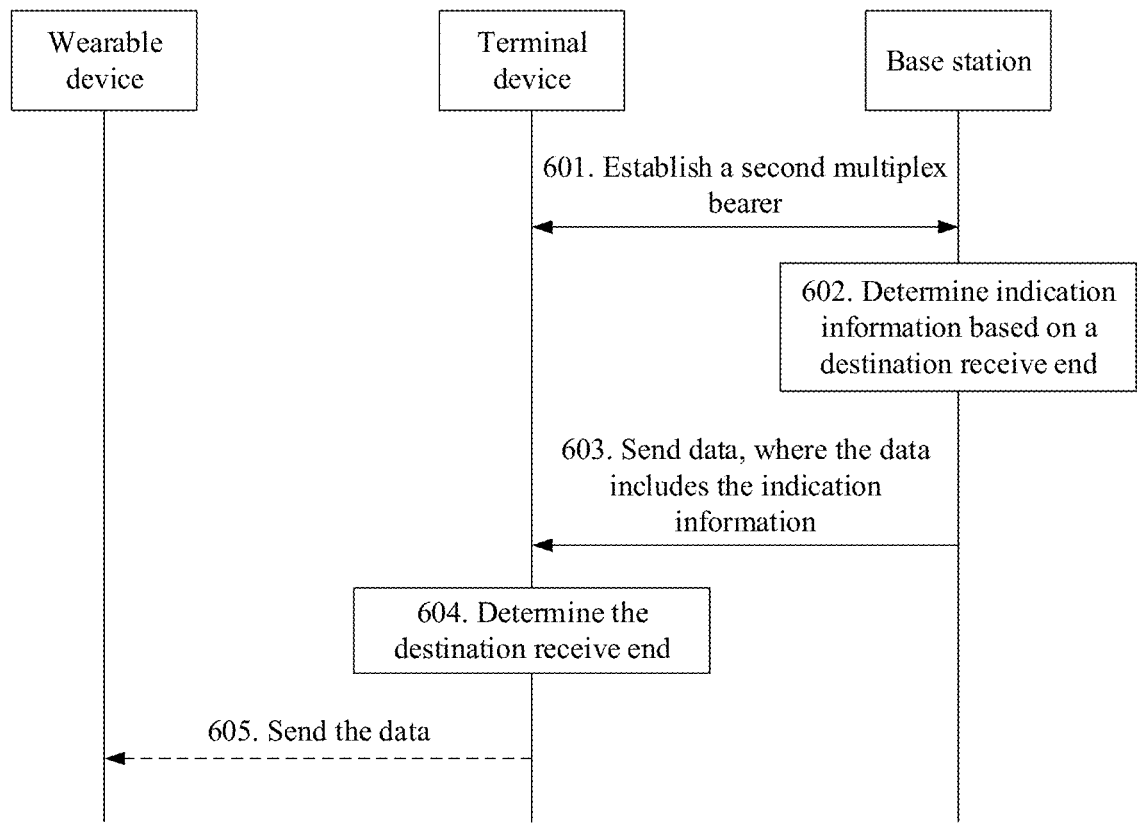
FIG. 6 is a schematic diagram of another embodiment of a receive end determining method according to an embodiment of the present invention.

Referring to FIG. 6, the embodiments of the present invention provide another embodiment of a receive end determining method. The method includes the following steps.

Step 601. Establish a second multiplex bearer between a base station and a terminal device.

The second multiplex bearer is used to transmit data that is from the base station to a second device, and the second device includes the terminal device, a wearable device, or a combination of the terminal device and the wearable device.

For understanding of specific steps of establishing the bearer between the base station and the terminal device, refer to step 301 in the embodiment corresponding to FIG. 3.

After the second multiplex bearer is established between the base station and the terminal device, data in three different directions is transmitted by using the second multiplex bearer.

Step 602. The base station determines indication information based on a destination receive end of data.

The base station determines, based on the destination receive end of the data, the indication information that needs to be carried in the data, and adds the indication information to a reserved field or a new field of the data. For different destination receive ends, indication information carried in the data is different. Specifically, the indication information may have different forms. Optionally, in a first example, the indication information may be a destination address. When the destination receive end is the terminal device, the base station encapsulates an address of the terminal device. When the destination receive end is the wearable device, the base station encapsulates an address of the wearable device. It should be noted that, when the destination receive end is the combination of the terminal device and the wearable device, a special address needs to be defined. The special address is a combined address of the wearable device and the terminal device, and is used to indicate addresses of the wearable device and the terminal device. For example, the special address is an address space. The address space does not overlap with an address space of the terminal device or an address space of the wearable device. In other words, addresses in the address space do not belong to the address space of the terminal device or the address space of the wearable device. The address space is the combined address of the wearable device and the terminal device.

Optionally, in a second example, the base station adds the indication information to the reserved field or the new field of the data based on the destination receive end. For example, a flag of a "04" flag bit of the reserved field is "00", indicating that the destination receive end of the data is the terminal device; a flag of a "04" flag bit of the reserved field is "01", indicating that the destination receive end of the data is the wearable device; a flag of a "04" flag bit of the reserved field is "10", indicating that destination receive ends of the data are the terminal device and the wearable device. It can be understood that, the special address in the first example may alternatively be indicated by using the flag bit in the reserved field or the new field in this example. The flags of the flag bit in this example, such as "01" and "00", are merely examples for description, but not for limitation. For example, a correspondence between flags of a flag bit and destination receive ends is shown in the following Table 4.

TABLE 4

| Flag of a flag bit | Destination receive end |
| --- | --- |
| "00" | Terminal device |
| "01" | Wearable device |
| "10" | Terminal device and wearable device |

Optionally, in a third example, the indication information is data service type information. Specifically, the base station determines the data service type information based on the destination receive end. A service type includes text information, picture information, voice information, or the like. It can be understood that the base station may preconfigure a correspondence between service types and destination receive ends. The correspondence is shown in the following Table 5.

TABLE 5

| Service type | Destination receive end |
| --- | --- |
| Sports data information | Terminal device |
| Picture information | Wearable device |
| Text information | Terminal device and wearable device |

Step 603. The base station sends the data to the terminal device by using the second multiplex bearer, where the data includes the indication information used to indicate the destination receive end.

Step 604. The terminal device receives, by using the second multiplex bearer, the data sent by the base station, and determines the destination receive end based on the indication information.

The data sent by the base station and received by the terminal device includes the indication information. In the first example in step 302, when the indication information is a destination address, the terminal device determines, by using the destination address, whether the data is data sent to the terminal device. If determining that the destination address is the address of the terminal device, the terminal device processes the sports data, for example, displays and/or stores the sports data. If determining that the destination address is the address of the wearable device, the terminal device does not need to process the sports data and directly forwards the data to the wearable device. It should be noted that, if the terminal device determines that the destination address is a special address, the terminal device pre-stores the special address. The terminal device processes (for example, displays and/or stores) the data, and sends the data to the wearable device.

Optionally, in the second example in step 302, the terminal device pre-stores the correspondence, in Table 4, between flags of a flag bit and destination receive ends. For example, the terminal device determines the destination receive end based on the correspondence between flags of the "04" flag bit in the reserved field or the new field of the data and destination receive ends. For a data processing manner of the terminal device, refer to the description of the first example in this step for understanding, and details are not repeated herein.

Optionally, in the third example in step 302, when the indication information is the service type information, the terminal device pre-stores the correspondence, in Table 5, between service types and destination receive ends, the terminal device determines the destination receive end based on the correspondence between data service type information and "destination receive ends". For a data processing manner of the terminal device, refer to the description of the first example in this step for understanding, and details are not repeated herein.

Step 605. The terminal device sends the data to the destination receive end.

A destination receive end is the terminal device, the wearable device, or a combination of the terminal device and the wearable device. When the destination receive end is the wearable device or the combination of the terminal device and the wearable device, the terminal device sends the data to the wearable device.

When the destination receive end is the terminal device, the terminal device sends the data to a higher layer of the terminal device, so that the terminal device processes the data at the higher layer.

In this embodiment of the present invention, a multiplex bearer is established between the terminal device and the base station, and the multiplex bearer may transmit data of different receive ends. Different indication information in the data is used to distinguish between the different destination receive ends, and there is no need to establish or reconfigure different bearers for the different receive ends. The terminal device determines a destination receive end of data based on indication information carried in the data. In this way, a quantity of bearers is effectively reduced, network resources are saved, a quantity of devices that can be supported by a network is increased, and impact on the bearer is reduced when a data direction is changed.

It should be noted that, a difference between the receive end determining method in the downlink data transmission process in the embodiment corresponding to FIG. 6 and the receive end determining methods in the embodiments corresponding to FIG. 4 and FIG. 5 lies in that: The data transmit end changes from the wearable device to the base station, and the terminal device receives the data sent by the base station. The specific receive end determining method is similar to that specific to the uplink data. For details, refer to the embodiment corresponding to FIG. 6 for understanding. Details are not repeated herein.

Based on the foregoing embodiments, optionally, before step 303, step 402, step 502, or step 603, the method further includes:

allocating, by the base station to the wearable device and the terminal device, a key used during data transmission.

The key includes three types: Ka, Kb, and Kc. The key is corresponding to a data direction, namely, the destination receive end of data. For example, Ka is used for data transmission in which a destination receive end is the terminal device.

Kb is used for data transmission in which a destination receive end is the base station.

Kc is used for data transmission in which destination receive ends are the base station and the terminal device.

Optionally, when the wearable device or the terminal device is performing key negotiation with a network, data direction information may be carried in a key negotiation message, for example, a negotiation request or a response message. The data direction information is used to indicate a data direction for which a negotiated key is used, so that the wearable device or the terminal device processes, based on different data directions, data by using different keys.

Specifically, for a process of allocating Kb, namely, the key used for data transmission in which a destination receive end is the base station, refer to a prior-art process, in a protocol, of allocating a session key to the terminal device. However, related signaling for key negotiation and allocation between the wearable device and the base station needs to be forwarded via the terminal device.

A process in which the base station allocates Ka and/or Kc to the wearable device and the terminal device may be as follows.

There is a shared key, referred to as a master key, between the base station and the terminal device.

Keys Ks that may be allocated by the base station to the wearable device and the terminal device by using the master key are referred to as session keys (including Ka and Kc), and are used for secure communication with the terminal device and the wearable device.

1. The terminal device sends a session key negotiation request to the base station based on a data direction.

The key negotiation request includes the address of the wearable device, the address of the terminal device, and a unique identifier. The identifier is a random number generated by the terminal device.

2. The base station receives the session key negotiation request, and the base station feeds back a response to the terminal device based on the key negotiation request. The response includes two messages. A first message includes a session key Ks and a unique identifier. A second message includes a session key Ks and the address of the terminal device.

3. After receiving the response, the terminal device determines whether the received unique identifier matches the sent unique identifier. If the received unique identifier matches the sent unique identifier, the terminal device stores the session key Ks in the first message, and forwards the second message to the wearable device.

4. The wearable device receives the second message, obtains the session key Ks, and learns, based on the address of the terminal device, that the other party is the terminal device.

In this way, the session keys Ks are allocated to the terminal device and the wearable device.

It should be noted that the key negotiation request is initiated by the terminal device to the base station. The base station allocates, to the wearable device and the terminal device based on the received key negotiation request, keys specific to data in different directions.

Optionally, the key negotiation request may alternatively be initiated by the wearable device. When the key negotiation request is initiated by the wearable device, a principle of a specific process is the same as that of step 1 to step 4, except that the functions implemented by the terminal device in step 1 to step 4 are implemented by the wearable device, and that the functions implemented by the wearable device in step 1 to step 4 are implemented by the terminal device. Specific steps are not described in detail herein.

The wearable device and the terminal device use different keys based on different destination receive ends of data to be transmitted. In this embodiment, the wearable device and the terminal device use different keys for data of different destination receive ends, ensuring security of data transmission in different directions.

Figure 7:
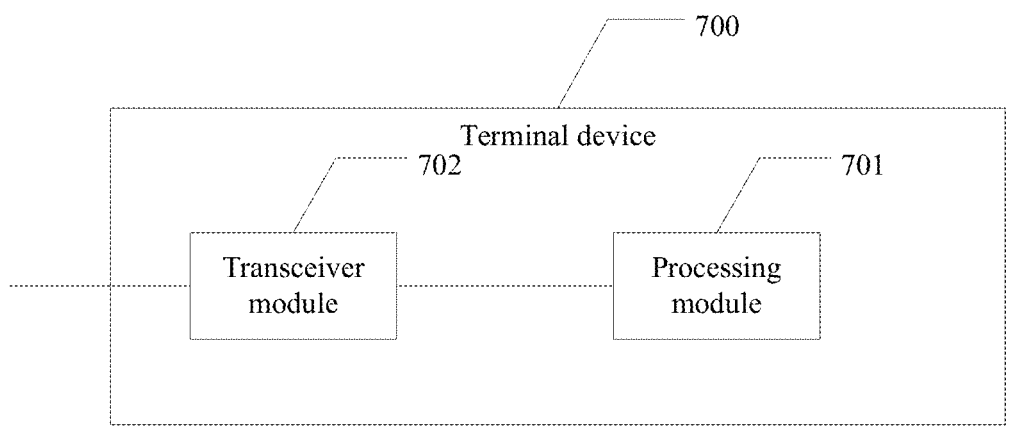
FIG. 7 is a schematic structural diagram of an embodiment of a terminal device according to an embodiment of the present invention.

The foregoing describes the receive end determining method. The following describes a terminal device to which the method is applied. Referring to FIG. 7, an embodiment of the present invention provides a terminal device 700, including a processing module 701 and a transceiver module 702.

The processing module 701 is configured to establish a first multiplex bearer between the terminal device and a wearable device or establish a second multiplex bearer between the terminal device and a base station. The first multiplex bearer is used to transmit data between the wearable device and a first device, and the first device includes the base station, the terminal device, or a combination of the terminal device and the base station. The second multiplex bearer is used to transmit data between the wearable device and a second device, and the second device includes the wearable device, the terminal device, or a combination of the terminal device and the wearable device.

The transceiver module 702 is configured to: receive, by using the first multiplex bearer, data sent by the wearable device, where the data includes indication information, and the indication information is used to indicate that a destination receive end is the base station, the terminal device, or the combination of the terminal device and the base station; or receive, by using the second multiplex bearer, data sent by the base station, where the data includes indication information, and the indication information is used to indicate that a destination receive end is the wearable device, the terminal device, or the combination of the terminal device and the wearable device.

The processing module 701 is further configured to determine the destination receive end based on the indication information.

Further, the transceiver module 702 is configured to transmit the data between the terminal device and the destination receive end when the destination receive end is the base station or the combination of the terminal device and the base station; or the transceiver module 702 is further configured to transmit the data between the terminal device and the destination receive end when the destination receive end is the wearable device or the combination of the terminal device and the wearable device.

Further, the processing module 701 is configured to perform steps, such as step 301 and step 601, that are performed by the terminal device in the embodiments corresponding to FIG. 3 and FIG. 6. The processing module 701 is further configured to perform steps, such as step 401, step 403, step 406, step 408, step 501, and step 503, that are performed by the terminal device in the embodiments corresponding to FIG. 4 and FIG. 5. The transceiver module 702 is further configured to perform steps, such as step 304, step 305, step 604, step 605, that are performed by the terminal device in the embodiments corresponding to FIG. 3 and FIG. 6, and is further configured to perform steps, such as step 403, step 404, step 406, step 409, step 503, and step 504, that are performed by the terminal device in the embodiments corresponding to FIG. 4 and FIG. 5. Details are not described in this embodiment of the present invention.

Figure 8:
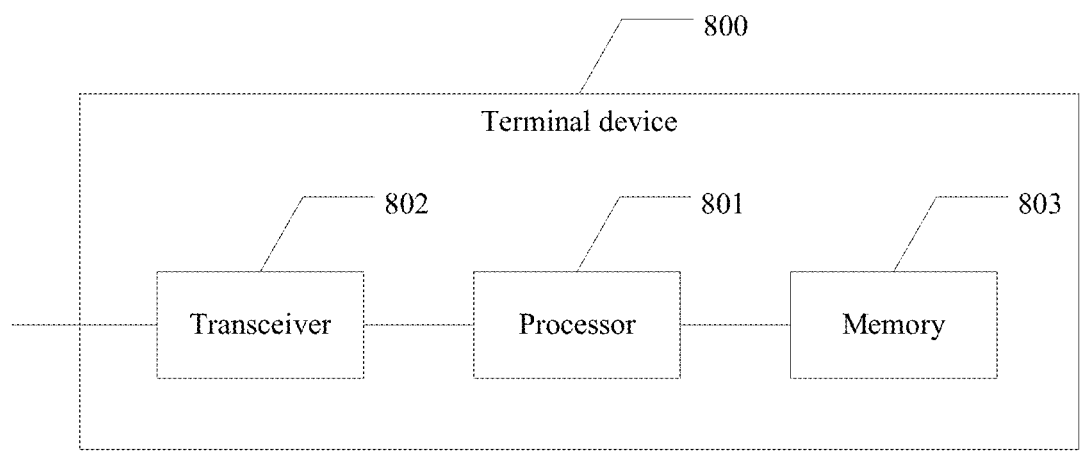
FIG. 8 is a schematic structural diagram of another embodiment of a terminal device according to an embodiment of the present invention.

Further, the terminal device in FIG. 7 is presented in a form of a function module. Herein, the "module" may be an application-specific integrated circuit (ASIC), a circuit, a processor that executes one or more software or firmware programs and a memory, an integrated logical circuit, and/or another component that can provide the foregoing functions. In a simple embodiment, persons skilled in the art may figure out that the terminal device in FIG. 7 may be in a form shown in FIG. 8. The processing module 701 may be implemented by using a processor 801 in FIG. 8, and the transceiver module 702 may be implemented by using a transceiver 802 in FIG. 8. A memory 803 is configured to store computer executable program code.

Figure 9:
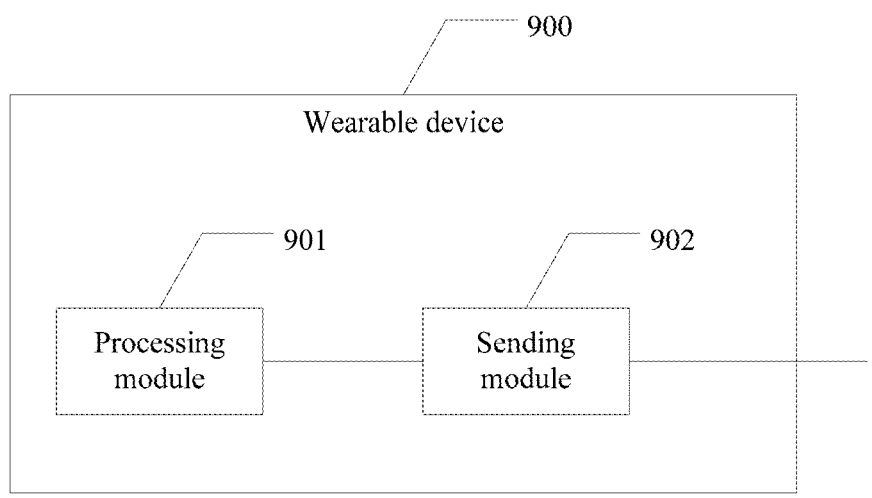
FIG. 9 is a schematic structural diagram of an embodiment of a wearable device according to an embodiment of the present invention.

As shown in FIG. 9, an embodiment of the present invention further provides a wearable device. The wearable device includes: a processing module 901 and a sending module 902.

The processing module 901 is configured to establish a first multiplex bearer between the wearable device and a terminal device. The first multiplex bearer is used to transmit data between the wearable device and a first device, and the first device includes a base station, the terminal device, or a combination of the terminal device and the base station.

The sending module 902 is configured to send data to the terminal device by using the first multiplex bearer. The data includes indication information, and the indication information is used to indicate that a destination receive end is the base station, the terminal device, or the combination of the terminal device and the base station.

Further, the processing module 901 is configured to perform steps, such as step 301 and step 302, that are performed by the wearable device in the embodiment corresponding to FIG. 3. The processing module 902 is further configured to perform steps, such as step 303, step 402, step 405, step 407, and step 502, that are performed by the wearable device in the embodiments corresponding to FIG. 3, FIG. 4, and FIG. 5.

Figure 10:
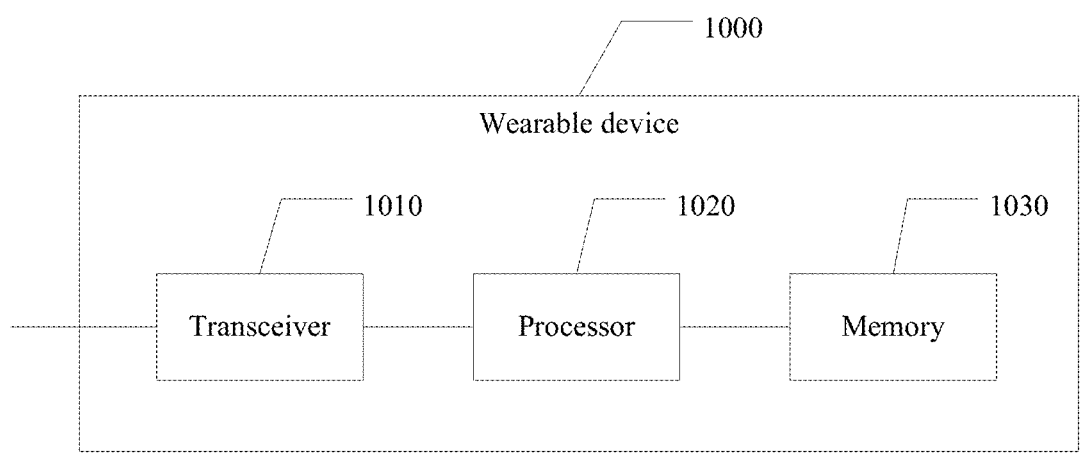
FIG. 10 is a schematic structural diagram of another embodiment of a wearable device according to an embodiment of the present invention.

Further, the wearable device in FIG. 9 is presented in a form of a function module. Herein, the "module" may be an application-specific integrated circuit (ASIC), a circuit, a processor that executes one or more software or firmware programs and a memory, an integrated logical circuit, and/or another component that can provide the foregoing functions. In a simple embodiment, persons skilled in the art may figure out that the wearable device in FIG. 9 may be in a form shown in FIG. 10. The modules may be implemented by using a transceiver 1010, a processor 1020, and a memory 1030 in FIG. 10.

Figure 11:
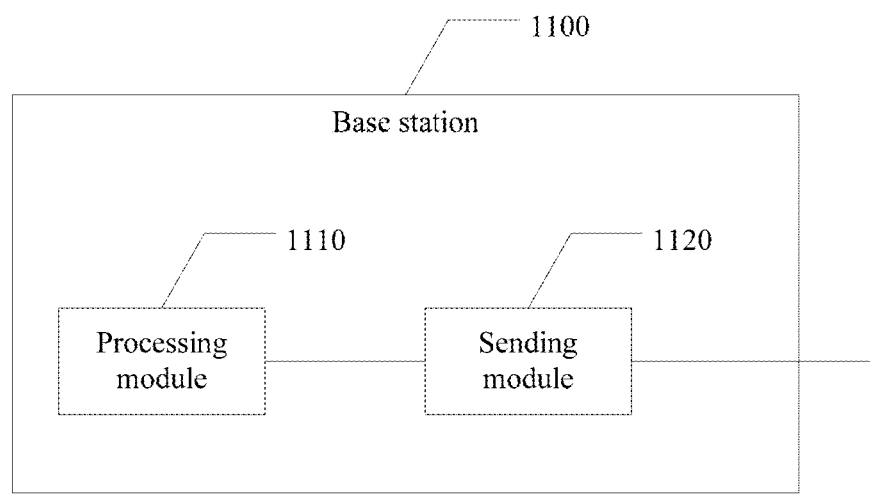
FIG. 11 is a schematic structural diagram of an embodiment of a base station according to an embodiment of the present invention.

As shown in FIG. 11, an embodiment of the present invention further provides a base station. The base station includes a processing module 1110 and a sending module 1120.

The processing module 1110 is configured to establish a second multiplex bearer between the base station and a terminal device. The second multiplex bearer is used to transmit data between the base station and a second device, and the second device includes a wearable device, the terminal device, or a combination of the terminal device and the wearable device.

The sending module 1120 is configured to send data to the terminal device by using the second multiplex bearer. The data includes indication information, and the indication information is used to indicate that a destination receive end is the terminal device, the wearable device, or the combination of the terminal device and the wearable device.

Figure 12:
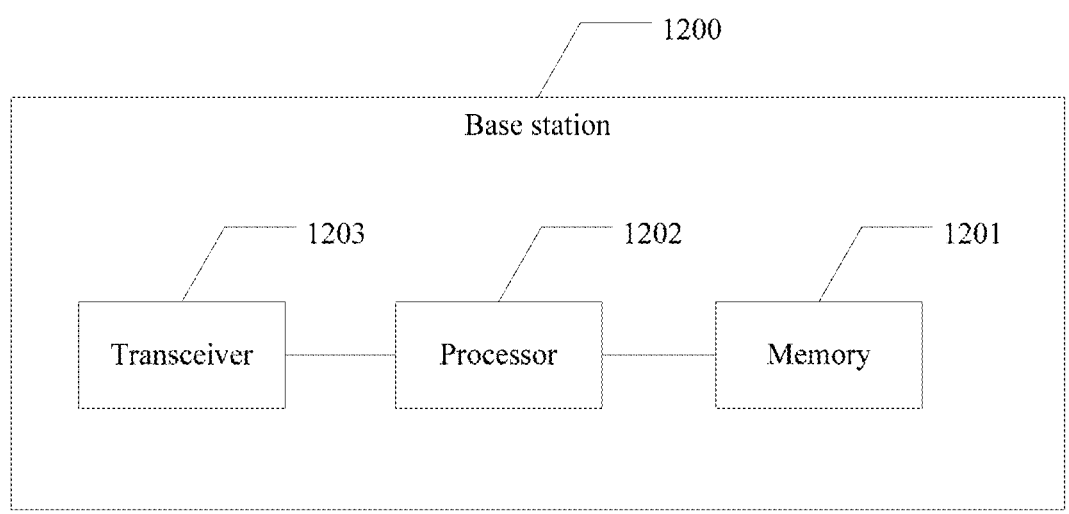
FIG. 12 is a schematic structural diagram of another embodiment of a base station according to an embodiment of the present invention.

Further, the processing module 1110 is configured to perform steps, such as step 601 and step 602, that are performed by the base station in the embodiment corresponding to FIG. 6. The sending module 1120 is configured to perform a step, such as step 603, that is performed by the base station in the embodiment corresponding to FIG. 6. Further, the base station in FIG. 11 is presented in a form of a function module. Herein, the "module" may be an application-specific integrated circuit (ASIC), a circuit, a processor that executes one or more software or firmware programs and a memory, an integrated logical circuit, and/or another component that can provide the foregoing functions. In a simple embodiment, persons skilled in the art may figure out that the base station in FIG. 11 may be in a form shown in FIG. 12. The modules may be implemented by using a memory 1201, a processor 1202, and a transceiver 1203 in a base station 1200 in FIG. 12.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method, comprising:

establishing a first multiplex bearer between a terminal device and a wearable device or establishing a second multiplex bearer between the terminal device and a base station, wherein the first multiplex bearer is used to transmit data between the wearable device and a first device, wherein the first device comprises one of the base station, the terminal device, or a combination of the terminal device and the base station, wherein the second multiplex bearer is used to transmit data between the base station and a second device, and wherein the second device comprises one of the wearable device, the terminal device, or a combination of the terminal device and the wearable device;

receiving, by the terminal device and through the first multiplex bearer, data from the wearable device, wherein the data comprises indication information, and wherein the indication information indicates that a destination receive end is one of the base station, the terminal device, or the combination of the terminal device and the base station, or receiving, by the terminal device and through the second multiplex bearer, the data from the base station, wherein the data comprises the indication information, and wherein the indication information indicates that the destination receive end is one of the terminal device, the wearable device, or the combination of the terminal device and the wearable device; and determining, by the terminal device, the destination receive end based on the indication information and a relationship table, wherein the relationship table includes entries for each of the base station, the terminal device, and the combination of the terminal device and the base station, or wherein the relationship table includes entries for each of the terminal device, the wearable device, and the combination of the terminal device and the wearable device.

2. The method according to claim 1, wherein the method further comprises:

when the destination receive end is one of the base station or the combination of the terminal device and the base station, transmitting, by the terminal device, the data to the destination receive end; or when the destination receive end is one of the wearable device or the combination of the terminal device and the wearable device, transmitting, by the terminal device, the data to the destination receive end.

3. The method according to claim 1, wherein the determining, by the terminal device, the destination receive end based on the indication information and the relationship table comprises:

obtaining, by the terminal device, the indication information from one of a reserved field or a new field of the data; and determining, by the terminal device, the destination receive end based on the indication information and the relationship table.

4. The method according to claim 1, wherein when the indication information is an address of the destination receive end, the determining step comprises:

determining, by the terminal device, the destination receive end based on the address of the destination receive end, wherein:

when the destination receive end is the combination of the terminal device and the base station, the address of the destination receive end is a combined address of the terminal device and the base station; or when the destination receive end is the combination of the terminal device and the wearable device, the address of the destination receive end is a combined address of the terminal device and the wearable device.

5. The method according to claim 1, wherein the indication information is an identity of the wearable device, and the method further comprises:

receiving, by the terminal device, a mode request from the wearable device, wherein the mode request comprises the identity of the wearable device and transmission mode information corresponding to the destination receive end;

establishing, by the terminal device, a correspondence between the identity of the wearable device and the destination receive end based on the mode request; and wherein the determining, by the terminal device, the destination receive end based on the indication information and the relationship table comprises:

determining, by the terminal device, the destination receive end based on the identity of the wearable device and the correspondence between the identity of the wearable device and the destination receive end.

6. The method according to claim 1, wherein the indication information is data service type information; and wherein the determining, by the terminal device, the destination receive end based on the indication information and the relationship table comprises:

determining, by the terminal device and based on a preconfigured correspondence between data service type information and destination receive ends, the destination receive end.

7. The method according to claim 1, wherein different keys are used for data of different receive ends; and after determining the destination receive end based on the indication information and the relationship table, the method further comprises:

processing, by the terminal device and using a corresponding key, the data based on the destination receive end.

8. A terminal device, comprising:

at least one processor, the at least one processor configured to establish a first multiplex bearer between the terminal device and a wearable device or establish a second multiplex bearer between the terminal device and a base station, wherein the first multiplex bearer is used to transmit data between the wearable device and a first device, wherein the first device comprises one of the base station, the terminal device, or a combination of the terminal device and the base station, wherein the second multiplex bearer is used to transmit data between the base station and a second device, and wherein the second device comprises one of the wearable device, the terminal device, or a combination of the terminal device and the wearable device; and a transceiver, the transceiver configured to receive, through the first multiplex bearer, data from the wearable device, wherein the data comprises indication information, and wherein the indication information indicates that a destination receive end is one of the base station, the terminal device, or the combination of the terminal device and the base station, or receive, through the second multiplex bearer, the data from the base station, wherein the data comprises the indication information, and wherein the indication information indicates that the destination receive end is one of the wearable device, the terminal device, or the combination of the terminal device and the wearable device, wherein:

the at least one processor is further configured to determine the destination receive end based on the indication information and a relationship table, wherein the relationship table includes entries for each of the base station, the terminal device, and the combination of the terminal device and the base station, or wherein the relationship table includes entries for each of the terminal device, the wearable device, and the combination of the terminal device and the wearable device.

9. The terminal device according to claim 8, wherein:
the transceiver is further configured to:
   transmit the data to the destination receive end when the destination receive end is one of the base station or the combination of the terminal device and the base station; or
   transmit the data to the destination receive end when the destination receive end is one of the wearable device or the combination of the terminal device and the wearable device.

10. The terminal device according to claim 8, wherein:
the at least one processor is further configured to:
   obtain the indication information from one of a reserved field or a new field of the data; and
   determine the destination receive end based on the indication information and the relationship table.

11. The terminal device according to claim 8, wherein:
the at least one processor is configured to:
when the indication information is an address of the destination receive end, determine the destination receive end based on the address of the destination receive end, wherein:
   when the destination receive end is the combination of the terminal device and the base station, the address of the destination receive end is a combined address of the terminal device and the base station; or
   when the destination receive end is the combination of the terminal device and the wearable device, the address of the destination receive end is a combined address of the terminal device and the wearable device.

12. The terminal device according to claim 8, wherein:
the transceiver is further configured to:
   when the indication information is an identity of the wearable device, receive a mode request sent by the wearable device, wherein the mode request comprises the identity of the wearable device and transmission mode information corresponding to the destination receive end; and
the at least one processor is further configured to:
   establish a correspondence between the identity of the wearable device and the destination receive end based on the mode request; and
   determine the destination receive end based on the identity of the wearable device and the correspondence between the identity of the wearable device and the destination receive end.

13. The terminal device according to claim 8, wherein:
the at least one processor is configured to:
   when the indication information is a data service type information, determine, based on a preconfigured correspondence between data service type information and destination receive ends, the destination receive end.

14. The terminal device according to claim 8, wherein:
the at least one processor is configured to:
   when different keys are used for data of different destination receive ends, process, using a corresponding key, the data based on the destination receive end.

15. A non-transitory computer readable storage medium, comprising computer program codes which when executed by at least one computer processor cause the at least one computer processor to:
   establish a first multiplex bearer between a terminal device and a wearable device or establish a second multiplex bearer between the terminal device and a base station, wherein the first multiplex bearer is used to transmit data between the wearable device and a first device, wherein the first device comprises one of the base station, the terminal device, or a combination of the terminal device and the base station, wherein the second multiplex bearer is used to transmit data between the base station and a second device, and wherein the second device comprises one of the wearable device, the terminal device, or a combination of the terminal device and the wearable device;
   receive, through the first multiplex bearer, data from the wearable device, wherein the data comprises indication information, and wherein the indication information indicates that a destination receive end is one of the base station, the terminal device, or the combination of the terminal device and the base station, or receive, through the second multiplex bearer, the data from the base station, wherein the data comprises the indication information, and wherein the indication information indicates that the destination receive end is one of the terminal device, the wearable device, or the combination of the terminal device and the wearable device; and
   determine the destination receive end based on the indication information and a relationship table, wherein the relationship table includes entries for each of the base station, the terminal device, and the combination of the terminal device and the base station, or wherein the relationship table includes entries for each of the terminal device, the wearable device, and the combination of the terminal device and the wearable device.

16. The non-transitory computer readable storage medium according to claim 15, wherein the medium comprises the computer program codes which when executed by the at least one computer processor further cause the at least one computer processor to:
   when the destination receive end is one of the base station or the combination of the terminal device and the base station, transmit the data to the destination receive end; or
   when the destination receive end is one of the wearable device or the combination of the terminal device and the wearable device, transmit the data to the destination receive end.

17. The non-transitory computer readable storage medium according to claim 15, wherein determining the destination receive end based on the indication information and the relationship table comprises:

obtaining the indication information from one of a reserved field or a new field of the data; and determining the destination receive end based on the indication information and the relationship table.

18. The non-transitory computer readable storage medium according to claim 15, wherein when the indication information is an address of the destination receive end, the determining step comprises:

determining the destination receive end based on the address of the destination receive end, wherein:

when the destination receive end is the combination of the terminal device and the base station, the address of the destination receive end is a combined address of the terminal device and the base station; or when the destination receive end is the combination of the terminal device and the wearable device, the address of the destination receive end is a combined address of the terminal device and the wearable device.

19. The non-transitory computer readable storage medium according to claim 15, wherein the indication information is an identity of the wearable device, and the medium comprises the computer program codes which when executed by the at least one computer processor further cause the at least one computer processor to:

receive a mode request from the wearable device, wherein the mode request comprises the identity of the wearable device and transmission mode information corresponding to the destination receive end;

establish a correspondence between the identity of the wearable device and the destination receive end based on the mode request; and determine the destination receive end based on the indication information and the relationship table comprises:

determining the destination receive end based on the identity of the wearable device and the correspondence between the identity of the wearable device and the destination receive end.

20. The non-transitory computer readable storage medium according to claim 15, wherein different keys are used for data of different receive ends; and after determining the destination receive end based on the indication information and the relationship table, the medium comprises the computer program codes which when executed by the at least one computer processor further cause the at least one computer processor to:

process, using a corresponding key, the data based on the destination receive end.

* * * * *